Warren Doble,
Frank H. Sully,
Inventors.

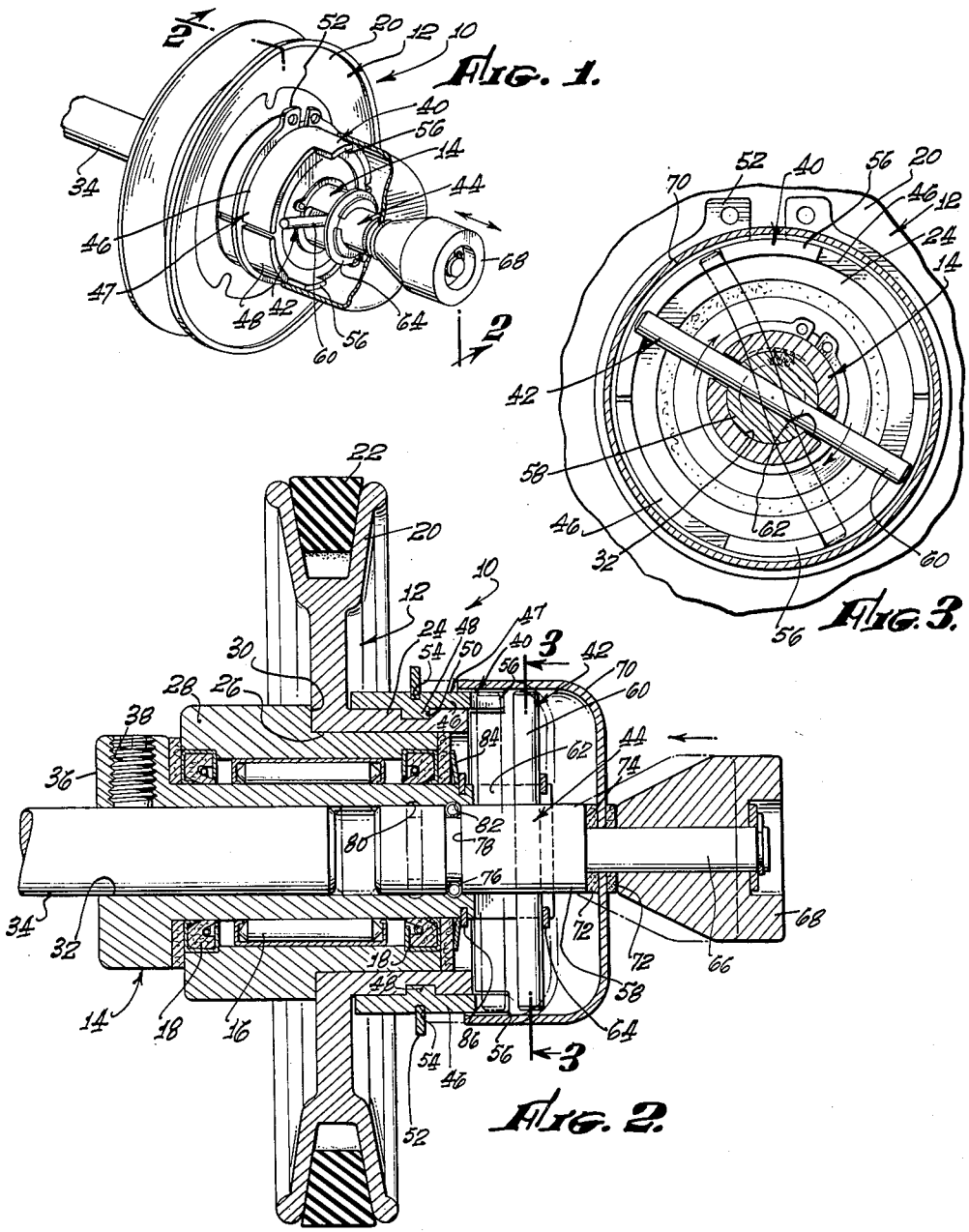

By Their Attorneys
Harris, Kiech, Foster & Harris.

United States Patent Office 3,005,528
Patented Oct. 24, 1961

3,005,528
CLUTCH
Warren Doble, North Hollywood, and Frank H. Sully, Burbank, Calif., assignors to Jabsco Pump Company, Burbank, Calif., a corporation of California
Filed Aug. 19, 1957, Ser. No. 678,950
4 Claims. (Cl. 192—55)

The present invention relates in general to clutches and, more particularly, to a clutch which may be regarded as being of the dog or jaw type, a primary object of the invention being to provide a clutch of this character which is simple and compact and capable of engagement with minimum shock.

Generally speaking, the invention contemplates a clutch which includes coaxial driving and driven rotary members respectively carrying interengageable clutch means, one of the clutch means being movable axially relative to the rotary member by which it is carried into engagement with the other clutch means. Such axial movement of the movable clutch means is effected by an actuating means operatively connected to the movable clutch means and axially movable between engaged and disengaged positions relative to the rotary member by which the movable clutch means is carried.

An important object of the invention is to provide circumferential slippage between one of the clutch means and the rotary member by which it is carried so as to minimize shock upon engagement of the two clutch means. More particularly, an object in this connection is to provide a slippable clutch means comprising annular shoe means biased into frictional engagement with the corresponding rotary member by an annular spring means. With this construction, when the actuating means is moved into its engaged position to interengage the two clutch means, the shoe means slips relative to the rotary member which it contacts so as to minimize engagement shock, which is an important feature.

Another important object of the invention is to make one of the clutch means a spring capable of flexing upon engagement with the other clutch means so as to further minimize engagement shock. An object in this connection is to provide a clutch wherein one of the clutch means comprises a diametrical spring pin carried by the actuating means, the ends of this spring pin respectively being engageable with diametrically opposed jaws forming the other clutch means so as to transmit rotation between the two rotary members. With this construction, the diametrical spring pin flexes upon engagement of the ends thereof with the respective jaws of the other clutch means to supplement the action of the slippable shoe means in absorbing shock, which is an important feature.

Another object of the invention is to provide a clutch wherein one of the rotary members is disposed within and rotatable relative to the other rotary member, the inner rotary member having an axial bore in which an actuator of the actuating means is axially movable between engaged and disengaged positions. Another object in this connection is to mount the diametrical spring pin mentioned on this actuator in such a manner that it extends diametrically therethrough with the ends of the spring pin projecting radially for engagement with the respective jaws of the other clutch means. A further object in this connection is to transmit rotation between the spring pin and the inner rotary member by disposing the spring pin in a diametrical, axially extending slot in the inner rotary member, whereby the spring pin engages the walls of such slot to produce the desired rotation transmission.

A further object of the invention is to provide spring detent means engaging the actuating means and the rotary member by which the movable clutch means is carried for releasably locking the actuating means in either an engaged position or a disengaged position. More particularly, an object of the invention is to provide a spring detent means which includes an annular coil spring disposed in an annular groove in the actuator and selectively positionable in axially spaced annular grooves in the peripheral wall of the axial bore in the inner rotary member. When this annular coil spring is disposed in one of the annular grooves in the inner rotary member, it releasably locks the actuator in the engaged position, and when it is disposed in the other annular groove in the inner rotary member, it releasably locks the actuator in the disengaged position.

The foregoing objects, advantages, features and results of the present invention, together with various other objects, advantages, features and results thereof which will be evident to those skilled in the clutch art in the light of this disclosure, may be attained with the exemplary embodiments of the invention described in detail hereinafter and illustrated in the accompanying drawings, in which:

FIG. 1 is a perspective view of a clutch which embodies the invention;

FIG. 2 is an enlarged, longitudinal sectional view of the clutch of FIG. 1 taken in the plane of the arrowed line 2—2 of FIG. 1;

FIG. 3 is a transverse sectional view of the clutch of FIGS. 1 and 2 taken in the plane of the arrowed line 3—3 of FIG. 2;

Figure 4:
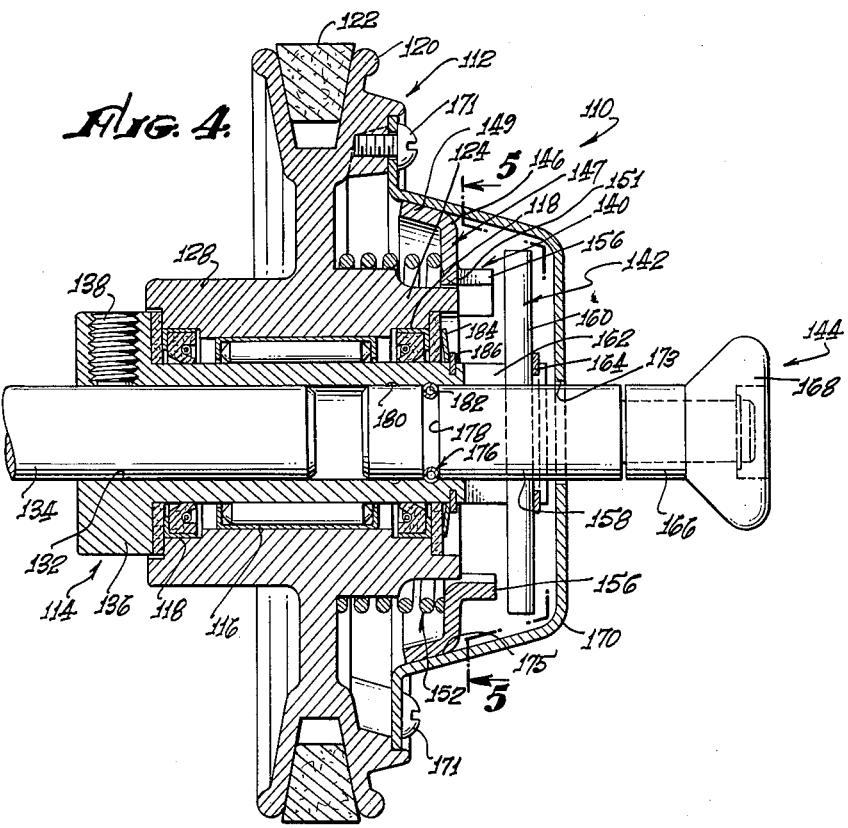
FIG. 4 is a longitudinal sectional view of another, and presently preferred clutch which embodies the invention.

The clutch illustrated in FIGS. 1 to 3 of the drawings is designated generally by the numeral 10 and is shown as including coaxial outer and inner rotary members 12 and 14, the outer rotary member 12 being regarded as a driving member herein and the inner rotary member 14 being regarded as a driven member. The driving member 12 is rotatably mounted on the driven member 14 by means of a bearing 16 of any suitable type disposed therebetween, suitable seals 18 being provided between the driving and driven members at the respective ends of the bearing to enclose the latter.

In the construction illustrated, the driving member 12 includes a pulley 20 having a V-belt 22 trained therearound. The V-belt 22 may be driven by any suitable power source, not shown, such as the engine of a boat, for example. As will be apparent, the driving member 12 is driven continuously through the pulley 20 and the V-belt 22 as long as the power source which drives the V-belt is operating.

The pulley 20 is provided with an axially extending, cylindrical flange 24 defining an axial bore 26 into which a reduced-diameter portion of a hub 28 is inserted, this hub forming part of the driving member 12 and being separated from the driven member 14 by the bearing 16 and the seals 18. The side of the pulley 20 opposite the cylindrical flange 24 thereon is seated against an annular shoulder 30 on the hub 28 and the reduced-diameter portion of the hub is pressed into the bore 26 in the pulley to provide a rotation transmitting connection between the pulley and the hub to render these elements a single unit in effect. However, it will be understood that the pulley 20 and the hub 28 may be keyed together in other ways.

The driven member 14 is provided with an axial bore 32 in one end of which is disposed a shaft 34 to be driven by the clutch 10. This shaft may, for example, be the shaft of a bilge pump, not shown, of a boat. The driven member 14 is provided with a head 36 carrying a set screw 38 for transmitting rotation between the driven member and the shaft 34, although again the shaft and the driven member may be keyed together in other ways.

The driving member 12 carries a clutch means 40 which is engageable by a complementary clutch means 42 carried by the driven member 14 to transmit rotation of the driving member 12 to the driven member 14, the clutch means 42 being axially movable into and out of engagement with the clutch means 40 by an actuating means 44. The clutch means 42 is shown in its disengaged position by solid lines in FIG. 2 and is shown in its engaged position by broken lines in this figure.

Considering the clutch means 40 on the driving member 12, it includes two semi-annular shoes 46 which, together, form an annular shoe means 47 encircling the cylindrical flange 24 of the pulley 20. The shoes 46 are provided internally thereof with aligned semi-annular ribs 48 disposed in an external annular groove 50 in the cylindrical flange 24. Providing the shoes 46 with the external ribs 48 disposed in the external annular groove 50 in the cylindrical flange 24 in this fashion permits relative rotation between the driving member 12 and the shoes 46, but prevents relative axial movement therebetween.

The shoes 46 are biased into frictional engagement with the cylindrical flange 24 of the driving member 12 or, more accurately, the cylindrical flange 24 of the pulley 20, by an annular spring means 52. In the particular construction illustrated, this annular spring means consists of a snap ring disposed in aligned external semi-annular grooves 54 in the shoes 46. However, it will be understood that other annular spring means may be substituted for the snap ring 52. As will be explained in more detail hereinafter, the shoes 46 may slip relative to the cylindrical flange 24 upon engagement of the clutch means 40 and 42 to minimize shock resulting from such engagement, which is an important feature.

The clutch means 40 further includes two diametrically opposed dogs or jaws 56 which extend axially from the shoes 46, respectively. These jaws are engageable with the movable clutch means 42 on the driven member 14 when the movable clutch means is in its engaged position.

Considering the movable clutch means 42 and the actuating means 44 in more detail, the latter includes an actuator 58 disposed in and movable axially of the bore 32 in the driven member 14, the actuator being disposed in the opposite end of the bore 32 from the shaft 34. The movable clutch means 42 consists of a diametrical spring having the form of a flexible and resilient drive pin 60 which extends diametrically through the actuator 58 and projects radially therefrom on opposite sides thereof. The length of the spring drive pin 60 is such that the ends thereof are respectively engageable with diametrically opposite sides of the jaws 56, as best shown in FIG. 3 of the drawings, thereby transmitting rotation of the driving member 12 to the drive pin 60 and the actuator 58. Such engagement between the drive pin 60 and the jaws 56 occurs when the actuator 58 is in an engaged position, shown in broken lines in FIG. 2. When the actuator 58 is in a disengaged position, shown in solid lines in FIG. 2, the ends of the drive pin 60 clear the jaws 56, i.e., are spaced axially from the jaws, to prevent engagement of the drive pin and the jaws. The drive pin 60, being a spring, flexes upon engagement of the ends thereof with the respective jaws 56 to supplement the shock absorbing action resulting from slippage of the shoes 46 relative to the cylindrical flange 24, which is another important feature.

In order to transmit rotation between the drive pin 60 and the driven member 14, the drive pin is disposed in and movable axially of a diametrical, axially extending slot 62 in one end of the driven member 14. As will be apparent, the drive pin 60 engages the walls of the slot 62 to transmit rotation of the drive pin to the driven member 14. Thus, the drive pin performs the dual function of acting as the clutch means 42 and of providing a keyed, axially slidable connection to the driven member 14. Withdrawal of the drive pin 60 from the slot 62, and, consequently, withdrawal of the actuator 58 from the bore 32, are prevented by a snap ring 64 which encircles the driven member 14 and closes the outer end of the slot.

Considering the manner in which the actuator 58 is moved between its engaged and disengaged positions to move the drive pin 60 into and out of engagement with the jaws 56, the actuator is provided with an axially outwardly extending stem 66 which has an actuating knob 68 rotatably mounted thereon. As will be apparent, the actuator may be moved between its engaged and disengaged positions by pushing inwardly and pulling outwardly on the actuating knob 68. For safety reasons, the drive pin 60 and the jaws 56 are enclosed by a cup 70 which is mounted on the stem 66 so as to move axially with the actuator 58 in the particular construction illustrated, the base of the cup 70 being disposed between two grommets 72 located between the actuating knob 68 and an annular shoulder 74 at the junction of the actuator and the stem 66.

In order to definitely locate the engaged and disengaged positions of the actuator 58 and the drive pin 60, a spring detent means 76 engaging the actuator and the driven member 14 and adapted to releasably lock the actuator in either its engaged position or its disengaged position is provided. The spring detent means 76 comprises an annular coil spring disposed in an external annular groove 78 in the actuator 58 and insertable into either of two internal annular grooves 80 and 82 in the driven member 14. The groove 80 corresponds to the engaged position while the groove 82 corresponds to the disengaged position.

Any tendency of the axial forces applied to the actuator knob 68 to produce relative axial movement of the driving and driven members 12 and 14 is prevented by disposing the hub 28 of the driving member 12 between the head 36 on the driven member 14 and a washer 84 which encircles the driven member 14 at the opposite end of the hub 28 from the head 36 and which is retained by a snap ring 86.

Considering the operation of the clutch 10 of the invention, it will be apparent that when the actuator 58 is in its disengaged position, as shown in solid lines in FIG. 2 of the drawing, the driving member 12 may rotate freely without transmitting rotation to the driven member 14 since the drive pin 60 is in a position such that it is cleared by the jaws 56 as they rotate. In order to engage the clutch 10, the operator merely presses inwardly on the actuator knob 68. This results in radial compression of the detent spring 76 sufficient to permit movement thereof from the annular groove 82 to the annular groove 80, whereupon this spring expands radially to releasably lock the actuator in its engaged position. As the actuator 58 is moved into its engaged position in this manner, the drive pin 60 is moved axially into a position wherein the ends thereof are engageable by the respective jaws 56. When the rotating jaws 56 strike the ends of the drive pin 60, the frictional engagement between the shoes 46 and the cylindrical flange 24 resulting from the inward biasing action of the snap ring 52 on the shoes permits slippage of the shoes relative to the flange 24 until the driven member 14, the shaft 34 and the apparatus driven by the shaft are brought up to speed. Such slippage may occur throughout anywhere from a fraction of a revolution to several revolutions of the pulley 20 and greatly minimizes the shock which would otherwise result from engagement of the jaws 56 with the ends of the drive pin 60, which is an important feature. Since the drive pin is an elastic member, as hereinbefore discussed, it also flexes somewhat as the ends thereof are struck by the jaws 56. This flexure of the drive pin 60 upon engagement by the jaws 56, which flexure is shown in somewhat exaggerated form in broken lines in FIG. 3, also reduces the shock incident to engagement of the jaws and the drive pin, which is an important feature.

Disengagement of the clutch 10 to interrupt rotation transmission betwen the driving member 12 and the driven member 14 is achieved merely by pulling outwardly on the actuating knob 68 to disengage the drive pin 60 from the jaws 56, the detent spring 76 moving from the groove 80 to the groove 82 as this occurs. It is thought that the manner in which disengagement of the clutch 10 occurs will be apparent so that a further discussion is not necessary.

It should be pointed out that the detent spring 76 plays an important function in that a relatively large push force must be applied to the actuating knob 68 to compress the detent spring sufficiently to permit its withdrawal from the groove 82. Because of this relatively large push force, the actuator 58 moves all the way from its disengaged position to its engaged position as soon as the spring detent 76 leaves the groove 82. Consequently, the drive pin 60 moves rapidly into full engagement with the jaws 56 to prevent the chattering of the jaws against the drive pin which might result were the drive pin moved into the engaged position slowly.

Figure 5:
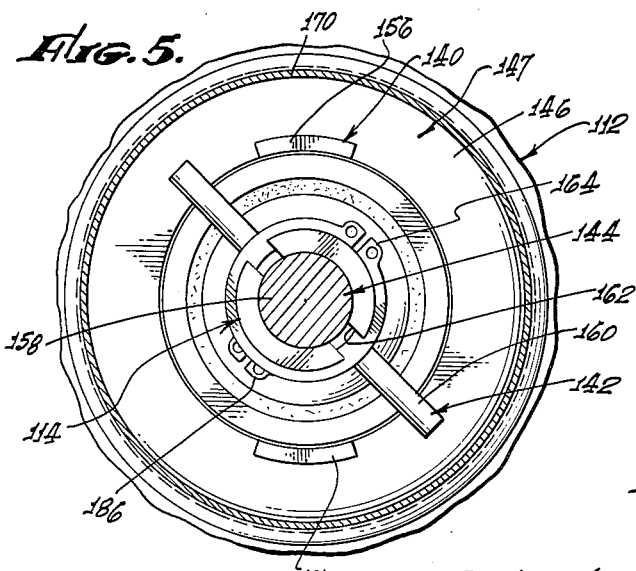
FIG. 5 is a transverse sectional view of the clutch of FIG. 4 taken in the plane of the arrowed line 5—5 of FIG. 4 of the drawing.

Turning now to FIGS. 4 and 5 of the drawings, illustrated therein is a clutch 110 of the invention which is similar to the clutch 10 and which includes components either identical to or similar to corresponding components of the clutch 10. Consequently, the various components of the clutch 110 are identified by reference numerals larger by 100 than the reference numerals utilized to designate the corresponding components of the clutch 10. In view of the similarity betwen the clutches 10 and 110, it will not be necessary to describe all of the components of the clutch 110 in detail since the descriptive matter relating to the corresponding components of the clutch 10 is applicable thereto, and only the differences between the clutch 110 and the clutch 10 will be considered in detail.

The driving member 112 differs from the driving member 12 in that the pulley 120 and the hub 123 are integral, instead of being formed as separate parts. Also, the cup 170 which encloses the clutch means 140 and 142 is mounted on the pulley 120 of the driving member 112 by screws 171, instead of being mounted on the reciprocable actuator 158. The actuator 158 merely projects axially through an opening 173 in the cup 170.

Another difference incorporated in the clutch 110 is that the annular shoe means 147 of the clutch means 140 comprises a single annular shoe 146, instead of two semiannular shoes. The annular shoe 146 is provided with a frusto-conical annular flange 149 which converges axially in a direction away from the pulley 20 and which is frictionally engageable with a complementary frusto-conical wall 175 of the cup or cover 170. The annular spring means 152 acts between the driving member 112 and the annular shoe 146 to bias the frusto-conical flange 149 of the shoe into frictional engagement with the frusto-conical wall 175 of the cover 170 to transmit rotation of the driving member to the shoe 146. In this embodiment, the annular spring means 152 comprises a coil spring acting in compression and seated at one end against the shoe 146 and at its other end against one side of the pulley 120. The jaws 156 of the clutch means 140 carried by the driving member 112 are formed integrally with and project axially from the annular shoe 146 in diametrically opposite locations for engagement with the ends of the spring drive pin 160.

In all other respects, the clutch 110 is identical to the clutch 10 and the operation of the clutch 110 is very similar to that of the clutch 10 and will be apparent from the description of the operation of the clutch 10 so that a further discussion herein is unnecessary, except to point out a couple of advantages of the clutch 110 over the clutch 10. One advantage is that since the spring drive pin 160 will occasionally strike the outer ends of the jaws 156 upon engagement of the clutch, the disclosed relationship between the axially-acting annular spring means 152 and the annular shoe 146 merely results in slight compression of the spring means and consequent partial disengagement of the annular shoe 146 and the cover 170 to prevent damage. Another advantage of the clutch 110 is that the annular shoe 146 can be so positioned relative to the outer end of the cylindrical flange 124 that the ends of the spring drive pin 160 strike an annular end surface 151 of the annular shoe 146 if the actuator 158 is moved slightly beyond the engaged position thereof upon moving it from its disengaged position toward its engaged position. When the ends of the spring drive pin 160 strike the end surface 151 of the shoe 146 in this fashion, the annular spring means 152 is compressed slightly to at least partially relieve the frictional engagement between the shoe 146 and the cover 170 momentarily, until such time as the spring detent means 176 releasably locks the actuator 158 precisely in its engaged position. This momentary partial disengagement of the shoe 146 and the cover 170 insures an impact-free start, which is an important feature.

The invention thus provides a simple and compact clutch which greatly minimizes the shock incident to engagement thereof because of the action of the slippable shoe means and the action of the spring drive pin. The particular relationship disclosed between the spring drive pin and the driven member is important since it permits the use of a simple reciprocable actuator to produce engagement and disengagement of the clutch. A further result of this relationship is that it provides a spring detent means on the reciprocable actuator which is simple and compact.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. In a clutch, the combination of: coaxial driving and driven rotary members one of which includes a cup-shaped cover rotatable therewith; two interengageable clutch means disposed within said cover and respectively carried by said rotary members, one of said clutch means being movable axially relative to the rotary member by which it is carried into engagement with the other of said clutch means, said other clutch means including annular shoe means rotatable relative to the rotary member by which this clutch means is carried and movable axially of such rotary member into frictional engagement with said cover in a direction opposite to the direction of movement of said one clutch means into engagement with said other clutch means; spring means engaging said shoe means and biasing said shoe means into frictional engagement with said cover; and actuating means operatively connected to said one clutch means and projecting axially through said cover for moving said one clutch means axially into engagement with said other clutch means.

2. In a clutch, the combination of: coaxial driving and driven rotary members; two interengageable clutch means respectively carried by said rotary members, one of said clutch means being movable axially relative to the rotary member by which it is carried into engagement with the other of said clutch means, one of said clutch means including shoe means engageable by the other clutch means and rotatable relative to and frictionally engageable with the rotary member by which the clutch means which includes said shoe means is carried; spring means engaging said shoe means and biasing said shoe means into frictional engagement with the rotary member last mentioned; actuating means operatively connected to said movable clutch means for moving said movable clutch means axially into engagement with the other of said clutch means; and a cup-shaped cover coaxial with said rotary members and mounted on one of said rotary members and enclosing both of said clutch means, said actuating means projecting axially through said cover and said shoe means being frictionally engageable with said cover.

3. In a clutch, the combination of: coaxial driving and driven rotary members; interengageable, driving and driven clutch means respectively carried by said driving and driven rotary members, said driven clutch means being movable axially relative to said driven rotary member into engagement with said driving clutch means, said driving clutch means including shoe means engageable by said driven clutch means and frictionally engageable with said driving rotary member; spring means engaging said shoe means and biasing said shoe means into frictional engagement with said driving rotary member; actuating means operatively connected to said driven clutch means for moving said driven clutch means axially into engagement with said driving clutch means; and a cup-shaped cover coaxial with said rotary members and enclosing both of said clutch means, said actuating means projecting axially through said cover, said cover forming a portion of said driving rotary member and said shoe means being frictionally engageable with said cover.

4. In a clutch, the combination of: coaxial driving and driven rotary members one of which is provided with an annular surface; two interengageable clutch means respectively carried by said rotary members, one of said clutch means being movable axially relative to the rotary member by which it is carried into engagement with the other of said clutch means, said other clutch means including annular shoe means rotatable relative to the rotary member by which this clutch means is carried and movable axially of such rotary member into frictional engagement with said annular surface in a direction opposite to the direction of movement of said one clutch means into engagement with said other clutch means; spring means engaging said shoe means and biasing said shoe means into frictional engagement with said annular surface; and actuating means operatively connected to said one clutch means for moving said one clutch means axially into engagement with said other clutch means.

References Cited in the file of this patent

UNITED STATES PATENTS

| | | |
|---|---|---|
| 311,179 | Eberhardt | Jan. 27, 1885 |
| 321,656 | Stolterfoht | July 7, 1885 |
| 729,649 | Nyberg | June 2, 1903 |
| 1,074,959 | Kreiling | Oct. 7, 1913 |
| 1,197,802 | De Laney | Sept. 12, 1916 |
| 1,392,932 | Giffin | Oct. 11, 1921 |
| 1,610,844 | Banner | Dec. 14, 1926 |
| 1,841,255 | Rybeck | Jan. 12, 1932 |
| 1,952,232 | Axien | Mar. 27, 1934 |
| 2,233,705 | Hook | Mar. 4, 1941 |
| 2,451,730 | Greenlee | Oct. 19, 1948 |
| 2,658,410 | Livers | Nov. 10, 1953 |
| 2,675,835 | Kiekhaefer | Apr. 20, 1954 |